June 28, 1955

L. G. TUBBS 2,712,115

REGULATORS

Filed Nov. 30, 1953

INVENTOR
Lester G. Tubbs.
BY
*Ezra H. Savage*
ATTORNEY

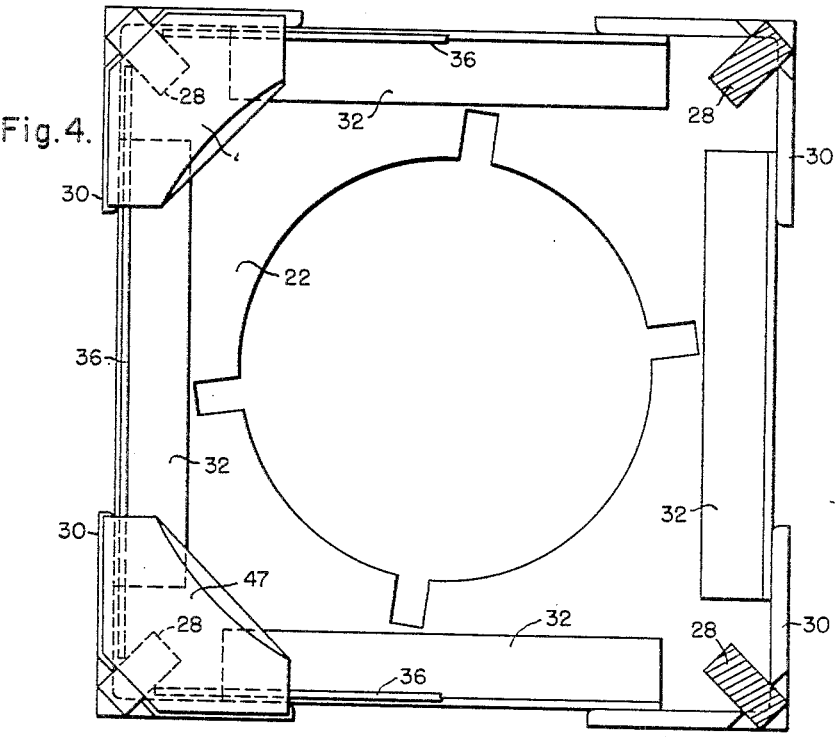
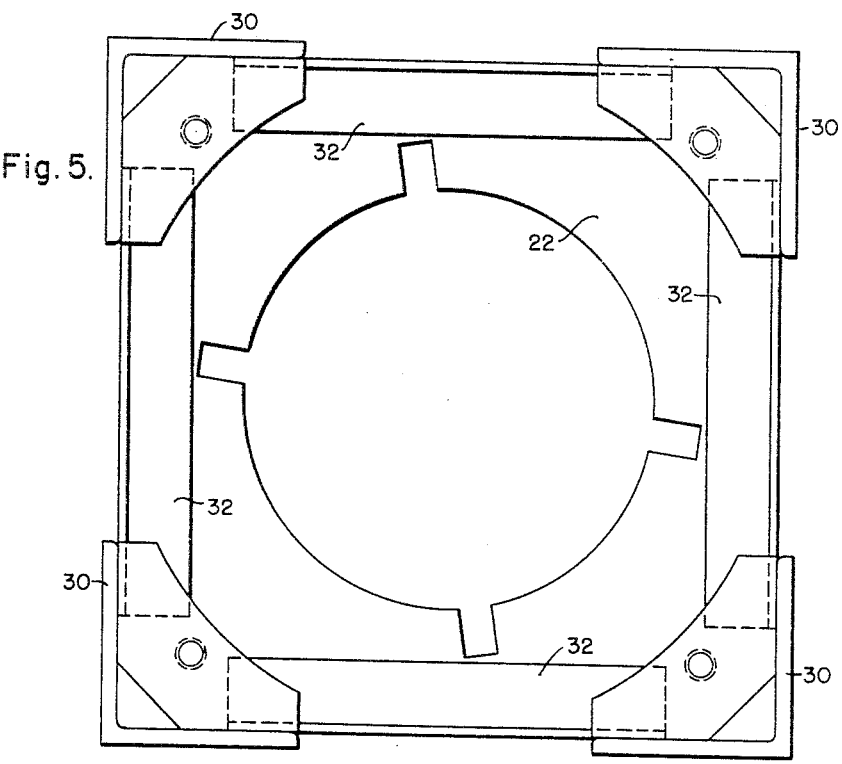

June 28, 1955   L. G. TUBBS   2,712,115
REGULATORS

Filed Nov. 30, 1953   3 Sheets-Sheet 3

United States Patent Office 2,712,115
Patented June 28, 1955

2,712,115

REGULATORS

Lester G. Tubbs, Pittsburgh, Pa., assignor to Westinghouse Electric Corporation, East Pittsburgh, Pa., a corporation of Pennsylvania Application November 30, 1953, Serial No. 394,946

3 Claims. (Cl. 336—160)

This invention relates to induction regulators, and more particularly to means for minimizing the noise produced by the induction regulator and for preventing damage thereto under short circuit conditions.

When surfaces exposed to the atmosphere vibrate at frequencies within the sound spectrum, sound is radiated therefrom. Thus, in induction regulators the vibration of surfaces exposed to the atmosphere causes noise to be emitted from the exposed surfaces. If the induction regulator is disposed within an enclosure, the vibrations produced by its inner structure are transmitted to the enclosure, which, in turn, emits noise due to these vibrations.

When a single phase induction regulator is energized and carries load current, a pulsating torque of twice line frequency is generated between the rotor and stator of the induction regulator. Normally, the induction regulator operates from a 60 cycle line and, therefore, the frequency of the pulsating torque is 120 cycles. This frequency of 120 cycles is known as the forcing or disturbing frequency for the induction regulator.

In practice, the pulsating torque causes a torsional vibration of both the rotor and stator of the induction regulator. It has been found that these torsional vibrations are a major factor in producing noise and that in prior art induction regulators, the magnitudes of the torsional vibrations of the stator and rotor are of such value as to produce an objectionally high noise level for the induction regulator. In addition, under short circuit conditions, these torsional vibrations of the stator and rotor have caused damage to the induction regulator.

An object of this invention is to provide for obtaining a natural frequency of torsional vibration for the stator of an induction regulator that is considerably below the forcing or disturbing frequency of the induction regulator without impairing the lateral stiffness of the stator, by providing a plurality of support members for the stator, the cross-sections of which have a higher moment of inertia in the radial direction than in the circumferential direction, to thereby minimize the amplitude of the torsional vibration of the stator, and thus minimize the noise produced by the induction regulator during operation and prevent damage thereto under short circuit conditions.

Another object of this invention is to provide for minimizing the noise of an induction regulator during operation and for preventing damage thereto under short circuit conditions, by so constructing its stator and rotor that they have the same natural frequency of torsional vibration, to thus locate the nodal point of vibration for the rotor and stator at the interconnection between the stator and rotor, thereby minimizing the torsional vibrations of apparatus located at the interconnection which would ordinarily transmit vibrations to the enclosure for the induction regulators which, in turn, would increase the noise level of the induction regulator.

A further object of this invention is to provide for minimizing the noise of an induction regulator and for preventing damage to the induction regulator under short circuit conditions without impairing the lateral stiffness of its stator and rotor, by providing a plurality of support members for the stator, the cross-sections of which have a higher moment of inertia in the radial direction than in the circumferential direction, thereby producing a natural frequency of torsional vibration for the stator that is considerably below the disturbing frequency without impairing the lateral stiffness of the stator, and by providing a fluted rotor shaft so as to produce a natural frequency of torsional vibration for the rotor that is considerably below the disturbing frequency without impairing the lateral stiffness of the rotor.

Still another object of this invention is to provide for minimizing the noise produced by an induction regulator during operation and for preventing damage thereto under short circuit conditions, by so constructing its stator and rotor that they have the same natural frequency of torsional vibration, and by so constructing the stator and rotor that their natural frequency of torsional vibration is considerably below the disturbing frequency for the induction regulator.

Other objects of this invention will become apparent from the following description when taken in conjunction with the accompanying drawings in which:

Fig. 4 is a view in section of a portion of the structure of Fig. 1 taken along the line IV—IV;

Fig. 5 is a view in section of the lower portion of the structure of Fig. 1 taken along the line V—V;

Figure 1:
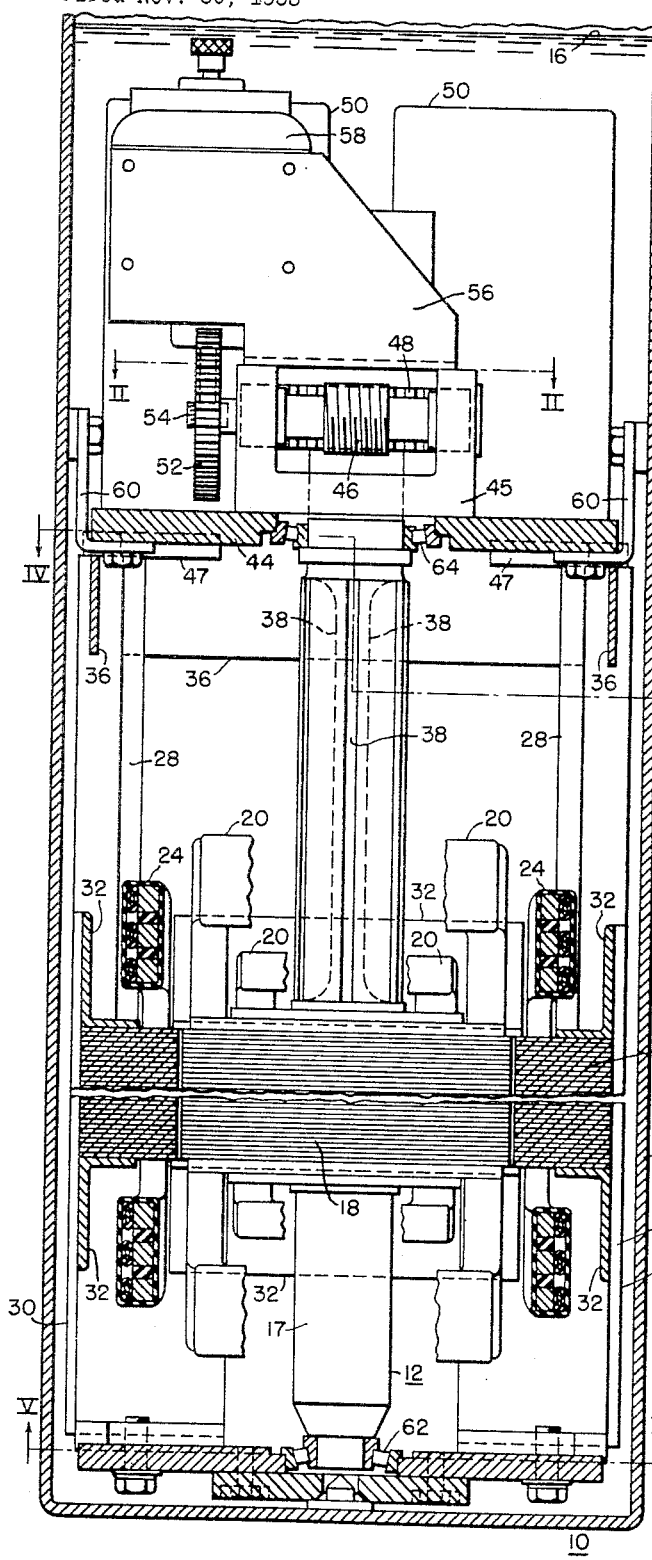
Figure 1 is a vertical sectional view, with parts broken away, of an induction regulator illustrating this invention.
Figure 2:
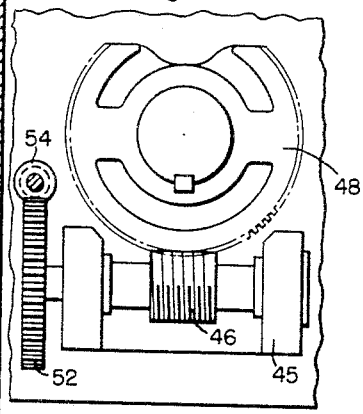
Fig. 2 is a view in section of the gear train shown in Fig. 1 and taken along the line II—II.
Figure 3:
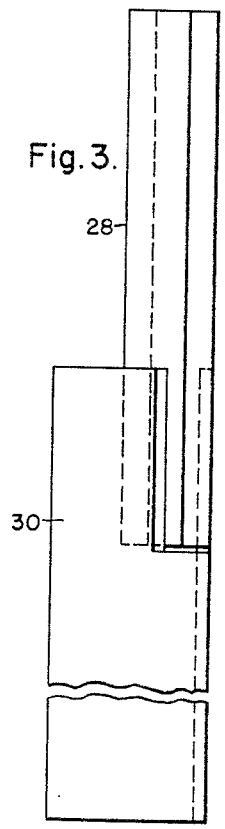
Fig. 3 is a view in elevation of an upper and lower frame support member shown in Fig. 1.

Referring to Figs. 1 through 5, there is illustrated an induction regulator 10 embodying a portion of the teachings of this invention. In general, the induction regulator 10 comprises a rotor 12 and a stator 14 disposed in cooperative relationship with one another. In this instance, the rotor 12 and the stator 14 are disposed within an enclosure or tank 15 and are surrounded by a dielectric medium 16 disposed within the tank 15. As illustrated, the rotor 12 comprises a rotor shaft 17 which carries in assembled relationship therewith a magnetic core member 18 and rotor windings 20. On the other hand, the stator 14 comprises a magnetic core member 22 and stator windings 24 which are suitably mounted within the tank 15.

When the induction regulator 10 is energized and current flows through the rotor and stator windings 20 and 24, respectively, a pulsating torque twice line frequency is generated between the rotor and the stator, thereby creating a torsional vibration in both the rotor 12 and the stator 14. In other words, in operation the rotor 12 and the stator 14 are subject to torsional vibrations due to the interaction of electrical forces between the rotor 12 and stator 14 when the windings 20 and 24, respectively, are energized. Of course, this interaction of electrical forces occurs even though the rotor 12 is stationary with respect to the stator 14.

Figure 7:
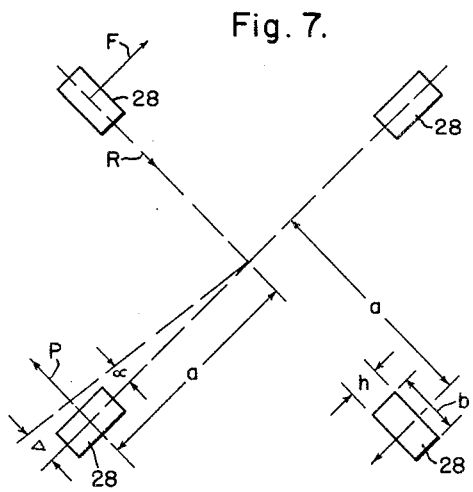
Fig. 7 is a schematic diagram of the upper frame support members of Fig. 1, and illustrates the various factors to be considered in calculating the spring constants of these support members.

In accordance with the teachings of this invention, a natural frequency of torsional vibration is obtained for the stator 14 that is considerably below the disturbing frequency for the induction regulator 10, and yet the lateral stiffness of the stator 14 is not impaired. This is accomplished by providing a plurality of upper frame corner support members 28 the cross-sections of which have a higher moment of inertia in the radial direction R, as shown in Fig. 7, than in the circumferential direction F. In particular, the cross-section of each of the support members is of rectangular shape, and the wider sides of each of the support members 28 are substantially parallel to a radial from the center of the rotor shaft 17. As illustrated, the longitudinal axes of the support members 28 are substantially parallel with the longitudinal axis of the rotor shaft 17.

By providing a natural frequency of torsional vibration for the stator 14 that is considerably below the disturbing frequency for the induction regulator 10, the amplitude of torsional vibration for the stator 14 is minimized. Since the amplitude of torsional vibration for the stator 14 is minimized, the vibrations transmitted from the stator 14 to the tank 15 are, likewise, minimized, thereby decreasing the noise level of the induction regulator 10.

Figure 6:
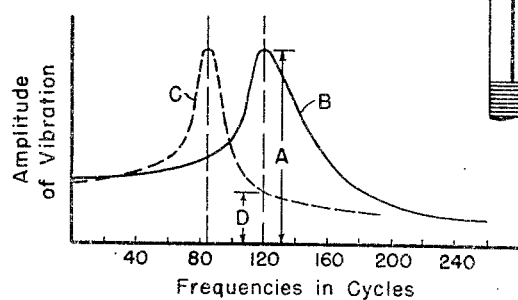
Fig. 6 is a graph the curves of which illustrate the manner in which the amplitude of torsional vibration varies with changes in frequency for various rotor and stator constructions.

The effect produced by providing a natural frequency of torsional vibration for the stator 14 that is considerably below the disturbing frequency of the induction regulator 10 can be better understood by referring to Fig. 6. Assuming that an induction regulator (not shown) is operating from a 60 cycle transmission line, then the disturbing frequency occurs at 120 cycles. Also, assume that the induction regulator (not shown) has a stator (not shown) that is so constructed that its natural frequency of torsional vibration occurs at 120 cycles. Under such conditions, the pulsating torque between the stator (not shown) and the rotor (not shown) produces an amplitude A of torsional vibration for the stator, provided the curve B represents the manner in which the amplitude of torsional vibration for the stator (not shown) varies with changes in frequency. However, when the upper frame support members 28 are provided as in the induction regulator 10, the curve, representing the manner in which the amplitude of the torsional vibration of the stator varies with frequency, is shifted to the left, as illustrated by the curve C. When so positioned, an amplitude D of torsional vibration is obtained for the stator 14 at the disturbing frequency of 120 cycles. Thus, by so constructing the stator 14, the amplitude of torsional vibration for the stator 14, as effected by the pulsating torque between the rotor 12 and stator 14, is minimized. Damage to the induction regulator 10 is also prevented.

In practice, the natural frequency of torsional vibration for the stator 14 is determined by the equation $$f = \tfrac{1}{2}\pi\sqrt{\tfrac{K_1}{I_1}}$$

considering that the rotor 12 and stator 14 are interconnected from a torsional standpoint at only one place. It is to be noted that this condition is essential in order to obtain the above-mentioned desired results. In the above equation, $I_1$ is the moment of inertia for the stator 14 about the axis of rotation and $K_1$ is the spring constant for the flexible members of the stator 14; namely, the support members 28.

Figure 8:
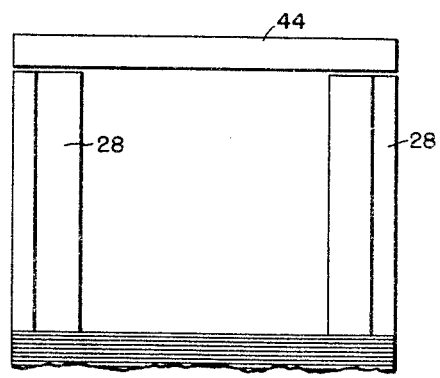
Fig. 8 is a view in elevation of the upper frame support members illustrated in Fig. 7; and, Fig. 9 is a view in elevation of a rotor shaft that can be substituted for the rotor shaft illustrated in Fig. 1.

Referring to Figs. 7 and 8, the spring constant $K_1$ for the support members 28 is determined as follows:

If P is the force applied to each support member 28, $l$ the length of each support member 28, E the modulus of elasticity for each support member, $$I = \tfrac{bh^3}{12}$$

and Δ the deflection of each support member 28, then $$\Delta = \tfrac{Pl^3}{3EI}$$

The angle of rotation of each support member 28 is represented by the equation $$\alpha = \tfrac{\Delta}{a}$$

where $a$ is the distance from the center of the rotor shaft 17 to the center of each of the support members 28.

Considering that the torque T applied to each support member 28 is represented by $T = 4Pa$ or $$P = \tfrac{T}{4a}$$

then $$\alpha = \tfrac{Tl^3}{12a^2EI}$$

By definition, the spring constant is the torque required to produce a twist of the flexible member equal to one radian. Therefore, $$K_1 = T_{\alpha=1} = \tfrac{12a^2EI}{e^3}$$

In this instance, the upper frame support members 28 are suitably secured to a plurality of lower frame support members or structural angles 30. In order to maintain the lower frame support members 30 in spaced relation in the horizontal direction a plurality of pressure angles 32 are provided. The pressure angles 32 also function to hold the laminations of the stator core member 22 in assembled relationship. On the other hand, in order to maintain the upper frame support members 28 in spaced relationship with respect to one another, braces 36 are provided. In practice, the braces 36 are welded to the support members 28.

In order to obtain a natural frequency of torsional vibration for the rotor 12 that is considerably below the disturbing frequency for the induction regulator 10, without impairing the lateral stiffness of the rotor shaft 17, the rotor shaft 17 is fluted. In other words, the rotor shaft 17 has a solid core throughout its length and is provided with a plurality of grooves 38, the grooves 38 being substantially parallel to each other and substantially evenly spaced about the rotor shaft 17. The size and number of the grooves 38 may vary somewhat, depending upon the flexibility it is desired to develop in the rotor shaft 17 and the lateral stiffness it is desired to retain therein.

In practice, the amplitude vibration curve for the rotor 12 is similar to the amplitude vibration curve C for the stator 14, and is similarly positioned, as will be explained more fully hereinafter. Thus, by constructing the rotor shaft 17 so that the natural frequency of torsional vibration for the rotor 12 is considerably below the disturbing frequency of the induction regulator 10, the vibrations transmitted from the rotor 12 to the tank 15 are minimized. Therefore, the noise level of the induction regulator 10 is decreased. Further, damage to the induction regulator 10 is prevented.

Figure 9:
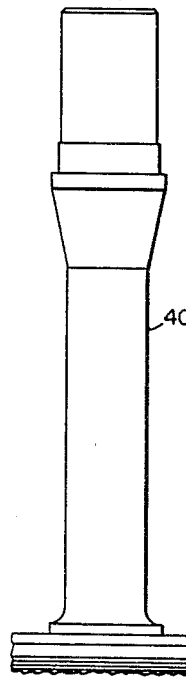

Referring to Fig. 9, there is illustrated a rotor shaft 40 which can be substituted for the rotor shaft 17 of Fig. 1. It is to be noted that the rotor shaft 40 has a reduced diameter. The reduced diameter of the rotor shaft 40 provides a natural frequency of torsional vibration for the rotor that is considerably below the disturbing frequency of its induction regulator. However, the rotor shaft 40, illustrated in Fig. 9, does not have as great a lateral stiffness as does the rotor shaft 17, of Fig. 1.

In practice, the natural frequency of torsional vibration for the rotor shaft 40 is determined by the equation $$f = \tfrac{1}{2}\pi\sqrt{\tfrac{K_2}{I_2}}$$

in which $I_2$ is the moment of inertia for the rotor about the axis of rotation and $K_2$ is the spring constant for that portion of the rotor shaft 40 that functions as a flexible member interconnecting the mass of the rotor to the mass of the stator 14. In the above equation, $$K_2 = \frac{\pi d^4 G}{32 l}$$

where $G$ is the modulus of elasticity in shear for the shaft 40, $d$ the reduced diameter of the shaft 40, and $l$ the length of the shaft 40 from the center of the rotor's mass to the plate 44. It is to be noted that the above equations are conditioned upon the fact that the rotor and stator of the induction regulator are only interconnected at one place from a torsional standpoint.

Also, in accordance with the teachings of this invention, the rotor 12 and stator 14 are so constructed as to have the same natural frequency of torsional vibration, thereby locating the nodal point of vibration for the stator 14 and rotor 12 at the interconnection between the rotor 12 and stator 14. Thus, at the interconnection between the rotor 12 and stator 14, there is substantially no torsional vibration.

By providing the same natural frequency of torsional vibration for the rotor 12 and stator 14, the torsional vibrations of apparatus located at the interconnection between the rotor 12 and stator 14 are minimized. In this instance, the means for interconnecting the stator 14 and the rotor 12 includes a horizontal plate 44, upper frame pads 47, which are suitably secured to the plate 44 and to the support members 28, a gearing support member 45 suitably secured to the plate 44, a worm 46, and a worm gear 48 that is driven by the worm 46. On the other hand, the apparatus located at the interconnection between the stator 14 and the rotor 12 includes transformers 50, a worm gear 52, a worm 54, a motor mounting bracket 56, and a motor 58 for intermittently effecting a rotation of the rotor 12. In operation, the motor 58 effects a rotation of the rotor 12, by actuating the gear train which extends from the worm 54 through the worm gear 52 and the worm 46, to the worm gear 48.

It has been found that best results are obtained if the nodal point of vibration for the rotor 12 and stator 14 is located at the plate 44. Since the other apparatus such as the transformers 50, the motor bracket 56, and the motor 58 are mechanically connected to the plate 44, the magnitudes of the vibrations of these components are maintained at a minimum. This results in a decrease in the amplitude of the vibrations transmitted by these components to the tank 15 and thus maintains the noise level of the induction regulator 10 at a minimum value. Further, since the amplitudes of the vibrations of the motor 58, the motor bracket 56, and transformers 50 are at a minimum, damage to the apparatus associated with the plate 44 is prevented.

In practice, the same frequency of torsional vibration for the rotor 12 and stator 14 can be obtained by satisfying the equation $$\frac{K_1}{K_2} = \frac{I_1}{I_2}$$

where $K_1$ is the spring constant for the support members 28, $K_2$ is the spring constant for the fluted portion of the rotor shaft 17, $I_1$ is the moment of inertia for the stator 14 about the axis of rotation, and $I_2$ is the moment of inertia for the rotor 12 about the axis of rotation.

In order to brace and center the stator 14 and the rotor 12 within the tank 15, a plurality of bracket members 60 are suitably interconnected between the plate 44 and the tank 15. Since the bracket members 60 are connected to the plate 44 which has substantially no torsional vibration, substantially no vibrations are transmitted from the rotor 12 or stator 14 through the bracket members 60 to the tank 15. This also contributes to maintaining a minimum noise level for the induction regulator 10.

As hereinbefore mentioned, the rotor 12 and stator 14 are only interconnected at one place from a torsional standpoint. This is more clearly brought out by considering that the lower end of the rotor shaft 17 is free to rotate in a lower support bearing 62, the only connection between the rotor 12 and stator 14, from a torsional standpoint, being through the upper frame pads 47, the plate 44, the gearing support member 45, the worm 46, and the worm gear 48. As illustrated, the rotor shaft 17 is held in operative position by the lower support bearing 62 and by an upper supporting bearing 64.

It is to be understood that the rotor shaft 40 of Fig. 9 could be substituted for the rotor shaft 17 and the stator and rotor would then have the same natural frequency of torsional vibration provided the abovementioned equation $$\frac{K_1}{K_2} = \frac{I_1}{I_2}$$

is satisfied.

The apparatus embodying the teachings of this invention has several advantages. For instance, the rotor 12 and the stator 14, and the rotor 40 and the stator 14 are so constructed that their natural frequency of torsional vibration is considerably below the disturbing frequency for the induction regulator, thereby minimizing the noise produced by the induction regulator. In addition, by so constructing the induction regulator, damage thereto is prevented. Further, the rotor 12 and the stator 14, and the rotor 40 and the stator 14 are so constructed that they have the same natural frequency of torsional vibration, thereby locating the nodal point of vibration for the rotor and the stator at the interconnection between the rotor and stator. This minimizes the vibrations produced by apparatus disposed at the interconnection, thus minimizing the noise produced by the induction regulator. Also, by so locating the nodal point of vibration for the rotor and stator, damage to the induction regulator is prevented. In addition, by so disposing the bracket members 60, a minimum of vibrations is transmitted from the stator and rotor through the bracket members 60 to the tank 15. This also minimizes the noise produced by the induction regulator.

Since numerous changes may be made in the above-described apparatus, and since different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In an induction regulator which produces a minimum of noise during operation and in which damage thereto under short circuit conditions is prevented, the combination comprising, a rotor including a shaft and rotor windings, a stator including stator windings, the stator being disposed in cooperative relationship with the rotor thereby subjecting the rotor and stator to torsional vibration due to the interaction of electrical forces between the stator and rotor when the windings thereof are energized, means for interconnecting the rotor shaft with the stator, and other apparatus, including means connected to the rotor shaft for effecting a rotation of the rotor, said other apparatus being associated with said interconnecting means, and the rotor and stator being so constructed as to have the same natural frequency of torsional vibration, whereby the nodal point of vibration for the stator and rotor occurs at said interconnecting means, thus minimizing the torsional vibration of said interconnecting means and said other apparatus associated with said interconnecting means, to thereby minimize during operation the noise produced by the induction regulator and prevent damage thereto under short circuit conditions.

2. In an induction regulator which produces a minimum of noise during operation and in which damage thereto under short circuit conditions is prevented, the combination comprising, a rotor including a shaft, and rotor windings, a stator including stator windings, the stator being disposed in cooperative relationship with the rotor thereby subjecting the rotor and stator to torsional vibration due to the interaction of electrical forces between the stator and rotor when the windings thereof are energized, means for interconnecting the rotor shaft with the stator, an enclosure for the induction regulator, a bracket member interconnected between said interconnecting means and said enclosure for centering the stator and rotor within said enclosure, other apparatus, including means connected to the rotor shaft for effecting a rotation of the rotor, said other apparatus being associated with said interconnecting means, and a dielectric medium disposed within said enclosure and surrounding the stator, the rotor, and said other apparatus, and the rotor and stator being so constructed as to have the same natural frequency of torsional vibration, whereby the nodal point of vibration for the stator and rotor occurs at said interconnecting means, thus minimizing the torsional vibration of said interconnecting means and said other apparatus associated with said interconnecting means, to thereby minimize during operation the noise produced by the induction regulator and prevent damage thereto under short circuit conditions.

3. In an induction regulator which produces a minimum of noise, the combination comprising, a rotor including a shaft and rotor windings, the rotor shaft having a solid core throughout its length and a plurality of grooves disposed in spaced relation about its surface and extending longitudinally thereof a predetermined distance, thereby providing a natural frequency of torsional vibration for the rotor that is considerably below the disturbing frequency for the induction regulator without impairing the lateral stiffness of the rotor, a stator including stator windings and a plurality of support members each having a rectangular shaped cross-section, the longitudinal axes of each of the support members extending in substantially the same general direction as the longitudinal axis of the rotor shaft, the stator being disposed in cooperative relationship with the rotor thereby subjecting the stator and rotor to torsional vibration due to the interaction of electrical forces between the stator and rotor when the windings thereof are energized, and the plurality of support members being so disposed that the wider sides of each of the support members are substantially parallel to a radial from the center of the rotor shaft, so that the rectangular cross-section of each of the support members has a higher moment of inertia in the radial direction than in the circumferential direction, thereby providing a natural frequency of torsional vibration for the stator that is considerably below the disturbing frequency for the induction regulator without impairing the lateral stiffness of the stator, means for interconnecting the rotor shaft with the stator, and other apparatus, including means connected to the rotor shaft for effecting a rotation of the rotor, said other apparatus being associated with said interconnecting means, and the rotor and stator being so constructed as to have the same natural frequency of torsional vibration, whereby the nodal point of vibration for the stator and rotor occurs at said interconnecting means, thus minimizing the torsional vibration of said interconnecting means and said other apparatus associated with said interconnecting means.

References Cited in the file of this patent
UNITED STATES PATENTS

| 2,269,245 | Blessing | Jan. 6, 1942 |
| 2,465,298 | Tubbs | Mar. 22, 1949 |

FOREIGN PATENTS

| 660,086 | Germany | May 16, 1938 |